United States Patent
Kroemmer et al.

(10) Patent No.: US 8,080,200 B2
(45) Date of Patent: Dec. 20, 2011

(54) PULVERIZED COAL INJECTION LANCE

(75) Inventors: Yvan Kroemmer, Goetzingen (LU);
Paul Goedert, Mondorf-Les-Bains (LU);
Georges Stamatakis, Canach (LU)

(73) Assignee: Paul Wurth S.A., Luxembourg (LU)

( * ) Notice: Subject to any disclaimer, the term of this patent is extended or adjusted under 35 U.S.C. 154(b) by 315 days.

(21) Appl. No.: 12/373,304

(22) PCT Filed: Jul. 5, 2007

(86) PCT No.: PCT/EP2007/056795
§ 371 (c)(1),
(2), (4) Date: Jan. 12, 2009

(87) PCT Pub. No.: WO2008/006764
PCT Pub. Date: Jan. 17, 2008

(65) Prior Publication Data
US 2010/0001443 A1    Jan. 7, 2010

(30) Foreign Application Priority Data
Jul. 12, 2006  (LU) .......................................... 91264

(51) Int. Cl.
*C22B 3/02* (2006.01)
(52) U.S. Cl. ........................ 266/225; 266/268
(58) Field of Classification Search .................. 266/225, 266/268
See application file for complete search history.

(56) References Cited

U.S. PATENT DOCUMENTS

| 2,560,074 A | 7/1951 | Bloomer |
| 3,758,090 A | 9/1973 | Shimotsuma et al. |
| 5,333,840 A * | 8/1994 | Skold et al. ..................... 266/47 |

FOREIGN PATENT DOCUMENTS

| EP | 0447908 | 9/1991 |
| EP | 0554673 | 8/1993 |
| EP | 1060272 | 12/2000 |

OTHER PUBLICATIONS

International Search Report PCT/EP2007/056795 Dated Sep. 27, 2007.

* cited by examiner

*Primary Examiner* — Scott Kastler
(74) *Attorney, Agent, or Firm* — Cantor Colburn LLP

(57) ABSTRACT

The present invention proposes a pulverized coal injection lance (10) for feeding pulverized coal from a rear end of the lance (10) to a front end (11) of the lance (10). The lance (10) comprises an outer pipe (12) for conveying combustive gas, and an inner pipe (14), coaxially arranged within the outer pipe (12), for conveying pulverized coal. The inner pipe (14) forms a separation wall for separating the pulverized coal from the combustive gas. The separation wall is at least partially discontinued in a region near the front end (11) of the lance (10), thereby forming a mixing region (16) within the pulverized coal injection lance (10). According to an important aspect of the invention, the outer pipe (12) and the inner pipe (14) have substantially the same length and wherein the inner pipe (14) comprises at least one lateral opening (18, 20) for allowing pulverized coal and combustive gas to come into contact within the pulverized coal injection lance (10) near the front end (11).

9 Claims, 1 Drawing Sheet

PULVERIZED COAL INJECTION LANCE

TECHNICAL FIELD OF THE INVENTION

The present invention relates to a pulverized coal injection lance, in particular for feeding pulverized coal into a tuyere of a blast furnace.

BRIEF SUMMARY OF RELATED ART

Pulverized coal injection lances are generally used to inject pulverized coal as a substitute to coke into a blast furnace. The pulverized coal is conveyed pneumatically through the lance and burns at the tip of the lance. The burning of the pulverized coal is aided by the supply of oxygen to the tip of the lance.

The so-called Oxycoal technology comprises an injection lance having an inner pipe for conveying the pulverized coal and an outer pipe, surrounding the inner pipe, for conveying the oxygen. At the tip of the lance, the oxygen meets the pulverized coal to improve the burning of the pulverized coal.

EP 1 060 272 describes that the burning of the pulverized coal can be improved and the flame maintained by providing a flow swirler between the coaxial pipes so as to impart a swirling motion to the oxygen fed to the tip of the lance. The effect of the flow swirler however depends very much on the structure of the lance. If the spiral angle is too deep, the oxygen is directed away from the pulverized coal and the burning efficiency is decreased. If the spiral angle is too shallow, the improvement of the burning efficiency is negligible.

It has also been suggested in EP 1 060 272, to provide the outer surface wall of the inner pipe with a plurality of dimples near the tip of the lance for reducing fluid flow resistance and for improving the mixing of the pulverized coal with the oxygen at the tip of the lance.

Although the above systems may, in certain conditions, be suitable for improving the burning efficiency, this effect is not guaranteed and there remains a risk that the flame is not maintained. Consequently the flame may have to be ignited again. Furthermore, the modification of the lance, either by providing a flow swirler or by providing a plurality of dimples, may prove to be rather costly.

EP 0 447 908 discloses a pulverized coal injection lance comprising an outer pipe for conveying combustive gas, and an inner pipe for conveying pulverized coal The inner pipe forms a separation wall for separating the pulverized coal from the combustive gas. According to EP 0 447 908 the inner pipe is shorter than the outer pipe, thereby forming a mixing region within the pulverized coal injection lance near the front end. This is a particularly easy and cheap way of obtaining a mixing region within the lance. The mixing region within the lance provides for an improved ignition of the flame. However, the pulverized coal and the combustive gas are completely free to mix in the mixing region.

BRIEF SUMMARY OF THE INVENTION

The invention provides an improved pulverized coal injection lance.

In order to achieve this object, the present invention proposes a pulverized coal injection lance for feeding pulverized coal from a rear end of the lance to a front end of the lance, wherein the lance comprises an outer pipe for conveying combustive gas, and an inner pipe, coaxially arranged within the outer pipe, for conveying pulverized coal, the inner pipe forming a separation wall for separating the pulverized coal from the combustive gas. The separation wall is at least partially discontinued in a region near the front end of the lance, thereby forming a mixing region within the pulverized coal injection lance. According to an important aspect of the invention, the outer pipe and the inner pipe have substantially the same length and the inner pipe comprises at least one lateral opening near the front end of the lance for allowing pulverized coal and combustive gas to come into contact within the pulverized coal injection lance near the front end.

In contrast to prior art lances where the pulverized coal mixes with the combustive gas after passing the tip of the lance, the discontinuity of the separation wall within the lance allows for the mixing of the pulverized coal and the combustive gas to start within the lance. It has been found that this facilitates flame ignition and improves the stability of the flame and also the burning efficiency. Indeed, with the mixing taking place inside the lance, near the front end thereof, the burning of the flame is maintained and is less prone to going out due to outside influences, such as fluid movement outside the lance. The mixing of the pulverized coal and the combustive gas inside the lance also facilitates the ignition of the flame; self-ignition of the flame is also improved.

The present arrangement, with the outer pipe and the inner pipe having substantially the same length and the inner pipe comprising at least one lateral opening near the front end of the lance, allows an improved control of the mixing of the pulverized coal and the combustive gas inside the lance. The partial mixing of the pulverized coal and the combustive gas allows an improved control over the temperature, thereby preventing burning of the "nose" of the lance. Furthermore, the inner pipe has a substantially constant diameter in and upstream of the mixing.

The lateral opening can comprise a plurality of slits. A series of four longitudinal slits can e.g. be equidistantly spaced around the perimeter of the front end of the inner pipe. These slits can extend to the front end of the inner pipe. The slits can have a width between 0.5 and 10 mm. The number and size of the slits can be adapted depending on the degree of mixing desired within the lance.

Alternatively, the lateral opening can comprise a plurality of boreholes. Such boreholes may e.g. have a diameter between 1 and 10 mm and are preferably arranged in a zigzag layout. The number, size and layout of the boreholes can be adapted depending on the degree of mixing desired within the lance.

Preferably, the outer and/or inner pipes are cylindrical.

The mixing region can have a length between 5 and 100 mm. The mixing region may have a length substantially corresponding to the diameter of the inner tube.

The combustive gas used in connection with such pulverized coal injection lances is preferably oxygen.

BRIEF DESCRIPTION OF THE FIGURES

The present invention will be more apparent from the following description of some not limiting embodiments with reference to the attached drawings. In these drawings, wherein identical reference numerals are used to indicate identical or similar elements.

DETAILED DESCRIPTION OF THE INVENTION

Figure 1:
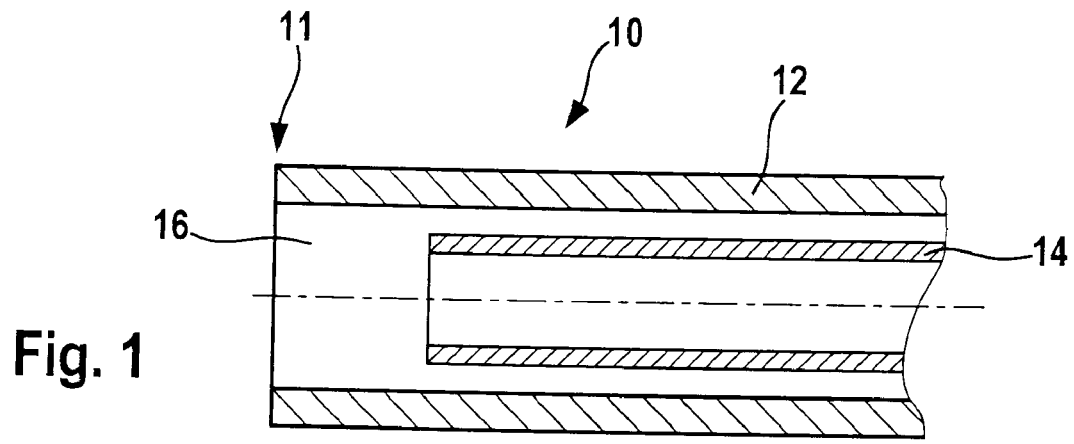
FIG. 1: shows a cut through a front portion of a prior art pulverized coal injection lance.
Figure 2:
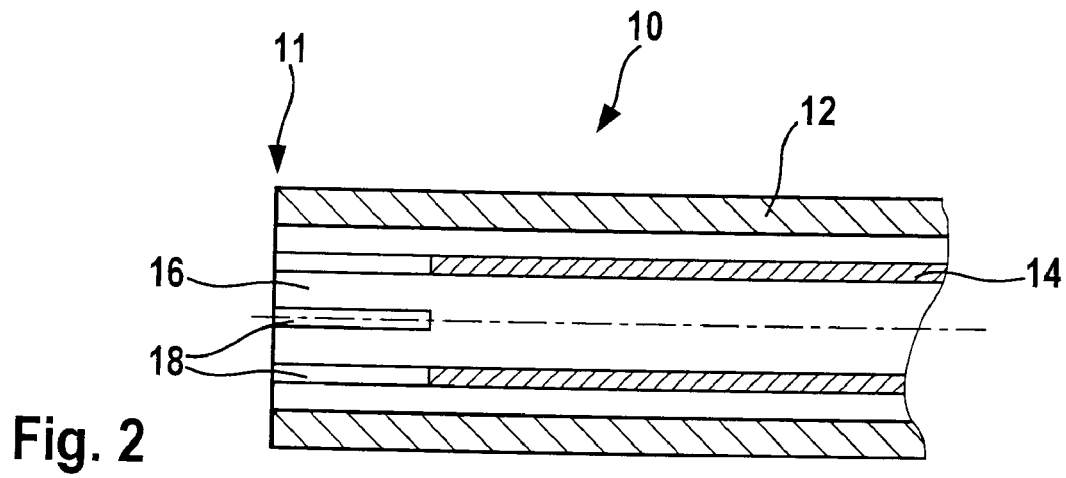
FIG. 2: shows a cut through a front portion of a pulverized coal injection lance according to a first embodiment of the invention.
Figure 3:
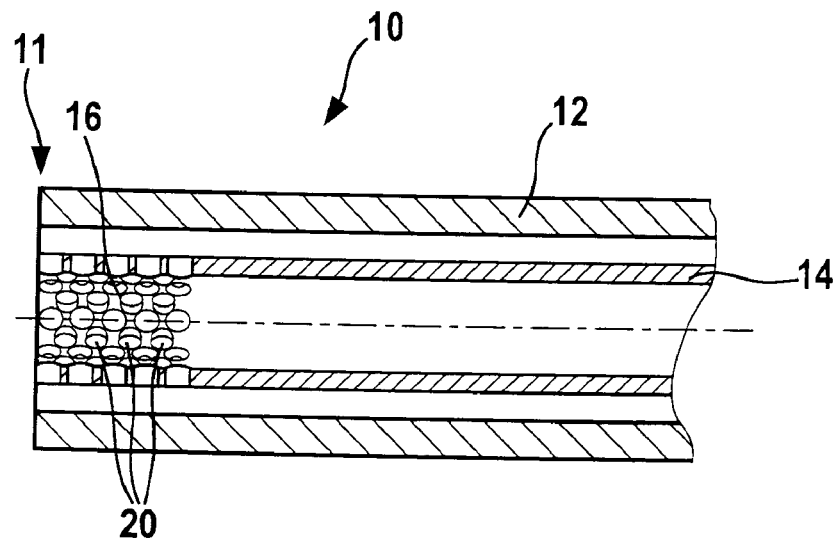
FIG. 3: shows a cut through a front portion of a pulverized coal injection lance according to a second embodiment of the invention.

FIGS. 1, 2 and 3 each show a front portion of a pulverized coal injection lance 10 for feeding pulverized coal from a rear end (not represented) to a front end 11 of the lance 10. Such a lance comprises an outer pipe 12 for conveying combustive gas and an inner pipe 14 for conveying pulverized coal. The inner pipe 14 is coaxially arranged within the outer pipe 12 and forms a separation wall for separating the pulverized coal from the combustive gas. According to the invention, the separation wall is at least partially discontinued in a region near said front end 11 of the lance 10, thereby forming a mixing region 16 within the lance 10.

Due to the mixing region 16, which is formed by the discontinuity of the separation wall, the pulverized coal and the combustive gas are allowed to mix already within the lance 10, which has been found to increase the stability of the flame and to facilitate the ignition of the flame. Such a flame is not so much influenced by conditions outside of the lance, in so far as the flame tends to keep burning, at least in the mixing region 16 of the lance 10.

In a prior art pulverized coal injection lance, as illustrated in FIG. 1, protection for which is not sought by the present patent application, the inner pipe 14 is shorter than the outer pipe 12, thereby completely discontinuing the separation wall in the mixing region 16. The pulverized coal and the combustive gas are completely free to mix in the mixing region 16.

According to the first embodiment of the invention, as illustrated in FIG. 2, the inner pipe 14 and the outer pipe 12 have substantially the same length and the discontinuity in the separation wall is formed by a series of four slits 18 arranged in the inner pipe 14. Due to the slits 18, the pulverized coal and the combustive gas are allowed to mix in the mixing region 16. The slits 18 in the illustrated embodiment are parallel to each other and to the axis of the inner pipe 12 and they extend over the whole length of the mixing region 16. It should be noted, however, that the slits 18 may also be arranged at an angle with respect to the axis of the inner pipe 12 or extend over only part of the length of the mixing region 16. Indeed, the degree of mixing in the mixing region 16 can be varied by choosing an appropriate number, orientation or size of slits 18.

According to the second embodiment of the invention, as illustrated in FIG. 3, the inner pipe 14 and the outer pipe 12 have substantially the same length and the discontinuity in the separation wall is formed by a plurality of boreholes 20 arranged in the inner pipe 14. Due to the boreholes 20, the pulverized coal and the combustive gas are allowed to mix in the mixing region 16. The boreholes 20 in the illustrated embodiment are arranged in zigzag layout and they extend over the whole length of the mixing region 16. It should be noted, however, that the boreholes 20 may also be arranged according to another layout or extend over only part of the length of the mixing region 16. Indeed, the degree of mixing in the mixing region 16 can be varied by choosing an appropriate number, orientation or size of boreholes 20.

The invention claimed is:

1. A pulverized coal injection lance for feeding pulverized coal into a tuyere of a blast furnace, said lance comprising:
    a cylindrical outer pipe for conveying combustive gas, and
    a cylindrical inner pipe, coaxially arranged within said outer pipe, for conveying pulverized coal, said inner pipe forming a separation wall for separating said pulverized coal from said combustive gas,
    said separation wall being at least partially discontinued in a region near said front end of said lance, thereby forming a mixing region within said pulverized coal injection lance for allowing pulverized coal and combustive gas to come into contact within said pulverized coal injection lance near said front end
    wherein said outer pipe and said inner pipe have substantially the same length and wherein said inner pipe comprises at least one lateral opening near said front end of said lance for allowing pulverized coal and combustive gas to come into contact within said pulverized coal injection lance near said front end.

2. The pulverized coal injection lance according to claim 1, wherein said at least one lateral opening comprises a plurality of slits.

3. The pulverized coal injection lance according to claim 2, wherein inner pipe has front end and said slits extend to said front end of said inner pipe.

4. The pulverized coal injection lance according to claim 2, wherein said slits have a width between 0.5 and 10 mm.

5. The pulverized coal injection lance according to claim 1, wherein said at least one lateral opening comprises a plurality of boreholes.

6. The pulverized coal injection lance according to claim 5, wherein said boreholes have a diameter between 1 and 10 mm.

7. The pulverized coal injection lance according to claim 5, wherein said boreholes are arranged in a zigzag layout.

8. The pulverized coal injection lance according to claim 1, wherein said mixing region has a length between 5 and 100 mm.

9. The pulverized coal injection lance according to claim 1, wherein said mixing region has a length substantially corresponding to a diameter of said inner tube.

* * * * *